(12) United States Patent
Kitao (10) Patent No.: US 11,729,643 B2
(45) Date of Patent: Aug. 15, 2023

(54) COMMUNICATION DEVICE AND IMAGE FORMING APPARATUS

(71) Applicant: KYOCERA Document Solutions Inc., Osaka (JP)

(72) Inventor: Tomoyuki Kitao, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 179 days.

(21) Appl. No.: 17/594,428

(22) PCT Filed: Apr. 17, 2020

(86) PCT No.: PCT/JP2020/016891
§ 371 (c)(1),
(2) Date: Oct. 15, 2021

(87) PCT Pub. No.: WO2020/218196
PCT Pub. Date: Oct. 29, 2020

(65) Prior Publication Data
US 2022/0191717 A1    Jun. 16, 2022

(30) Foreign Application Priority Data

Apr. 26, 2019  (JP) ................................ 2019-086332

(51) Int. Cl.
*H04W 24/04*         (2009.01)
*G06F 3/12*          (2006.01)

(52) U.S. Cl.
CPC ............ *H04W 24/04* (2013.01); *G06F 3/121* (2013.01); *G06F 3/1234* (2013.01)

(58) Field of Classification Search
CPC ........... G06F 3/121; G06F 3/1234; G06F 3/28
See application file for complete search history.

(56) References Cited

U.S. PATENT DOCUMENTS

| 9,715,271 | B2 * | 7/2017 | Kaestner | .................. | G06F 1/28 |
| 2013/0132758 | A1 * | 5/2013 | Shiba | ........................ | G06F 1/28 |
| | | | | | 713/340 |
| 2014/0047257 | A1 * | 2/2014 | Masson | ................. | G06F 1/3253 |
| | | | | | 713/320 |
| 2014/0059361 | A1 * | 2/2014 | Tajima | .................... | G06F 1/266 |
| | | | | | 713/300 |

FOREIGN PATENT DOCUMENTS

JP           2013109461 A      6/2013

\* cited by examiner

*Primary Examiner* — Benjamin O Dulaney
(74) *Attorney, Agent, or Firm* — Alleman Hall Creasman & Tuttle LLP (57) ABSTRACT

When a communication error has occurred in a communication with one of external devices connected to a connector portion, a communication control portion of a communication device sets, to a second value, a status value of a first enable signal output to a specific first output portion that corresponds to the external device in which the communication error has occurred, and sets, to a first value, a status value of a first enable signal output to a first output portion other than the specific first output portion. When the communication error has occurred, a hub portion restarts, and then sets all second enable signals to the second value. An application portion that corresponds to the first output portion other than the specific first output portion, maintains to be ON state regardless of occurrence of the communication error since the first enable signal has been set to the first value.

5 Claims, 7 Drawing Sheets

COMMUNICATION DEVICE AND IMAGE FORMING APPARATUS

TECHNICAL FIELD

The present invention relates to a communication device and an image forming apparatus including the communication device.

BACKGROUND ART

There is known an image forming apparatus of recent years that includes a host controller and a hub conforming to the USB (Universal Serial Bus) standard and performs data communications with a plurality of USB adaptive external devices connected to the image forming apparatus (see, for example, PTL 1).

In addition, the image forming apparatus can generate a voltage and apply the voltage to the plurality of external devices via a plurality of application portions (specifically, switch portions) by a bus power system defined in the USB standard. During a voltage application by the bus power system, the hub controls voltage applications by the plurality of application portions.

CITATION LIST

Patent Literature

[PTL 1] Japanese Patent Application Publication No. 2013-109461

SUMMARY OF THE INVENTION

Problems to be Solved by the Invention

The host controller restarts the hub if a communication error occurs in a communication with any of the external devices connected to the image forming apparatus. The restart causes the control of the voltage application by the hub to return to the initial state. As a result, the application of the voltage to the plurality of external devices is stopped.

The present invention has been made in view of such conventional circumstances, and it is an object of the present invention to provide a communication device and an image forming apparatus that can apply a voltage to a plurality of external devices via a plurality of application portions, and can, even if a communication error occurs in a communication with a part of the external devices, prevent stoppage of the application of the voltage to the other external devices.

Solution to the Problems

A communication device according to an aspect of the present invention includes a hub portion, a communication control portion, a plurality of application portions, and a plurality of first output portions. The hub portion is connected to a plurality of external devices. The communication control portion performs a data communication with the plurality of external devices through the hub portion. The plurality of application portions are provided in correspondence with the plurality of external devices and, upon receiving an effective signal, apply a voltage to each of the plurality of external devices through a power supply line. The plurality of first output portions are provided in correspondence with the plurality of application portions, wherein each of the plurality of first output portions is configured to receive a first enable signal from the communication control portion, receive a second enable signal from the hub portion, and output the effective signal or a stop signal according to status values of the first enable signal and the second enable signal, to a corresponding one of the application portions. In a case where a communication error has occurred in a data communication with one of the plurality of external devices, the communication control portion maintains, to a first value, a status value of the first enable signal output to one of the plurality of first output portions that corresponds to the one of the plurality of external devices in which the communication error has occurred, before and after an occurrence of the communication error, and upon the occurrence of the communication error, changes, from the first value to a second value that is different from the first value, a status value of the first enable signal output to another one of the plurality of first output portions that corresponds to another one of the plurality of external devices in which the communication error has not occurred. In the case where the communication error has occurred, the hub portion restarts the hub portion and after a restart of the hub portion, changes, from the second value to the first value, a status value of the second enable signal output to all of the plurality of first output portions. Each of the plurality of first output portions outputs the effective signal to each of the plurality of application portions respectively corresponding to the plurality of first output portions when status values of both the first enable signal and the second enable signal are each the second value.

An image forming apparatus according to another aspect of the present invention includes the communication device.

Advantageous Effects of the Invention

According to the aspects of the present invention, it is possible to provide a communication device and an image forming apparatus that can apply a voltage to a plurality of external devices via a plurality of application portions, and can, even if a communication error occurs in a communication with a part of the external devices, prevent stoppage of the application of the voltage to the other external devices.

BRIEF DESCRIPTION OF THE DRAWINGS

FIG. 3 is a flowchart showing an operation of the communication portion performed when a main power supply of the image forming apparatus shown in FIG. 1 is turned on.

DESCRIPTION OF EMBODIMENTS

The following describes an embodiment of the present invention with reference to the accompanying drawings for the understanding of the invention. It should be noted that the following embodiment is an example of a specific embodiment of the present invention and should not limit the technical scope of the present invention.

Figure 1:
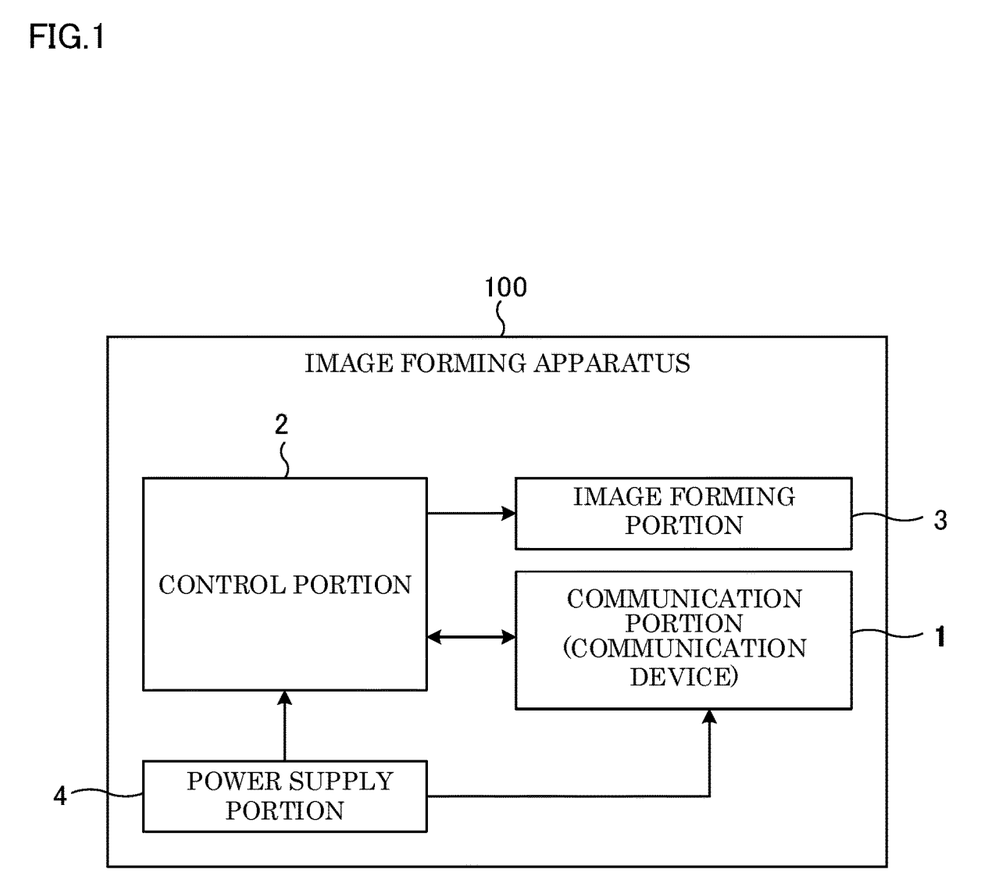
FIG. 1 is a block diagram showing a configuration of an image forming apparatus according to an embodiment.

In FIG. 1, an image forming apparatus 100 includes a communication portion 1, a control portion 2, an image forming portion 3, and a power supply portion 4.

Figure 2:
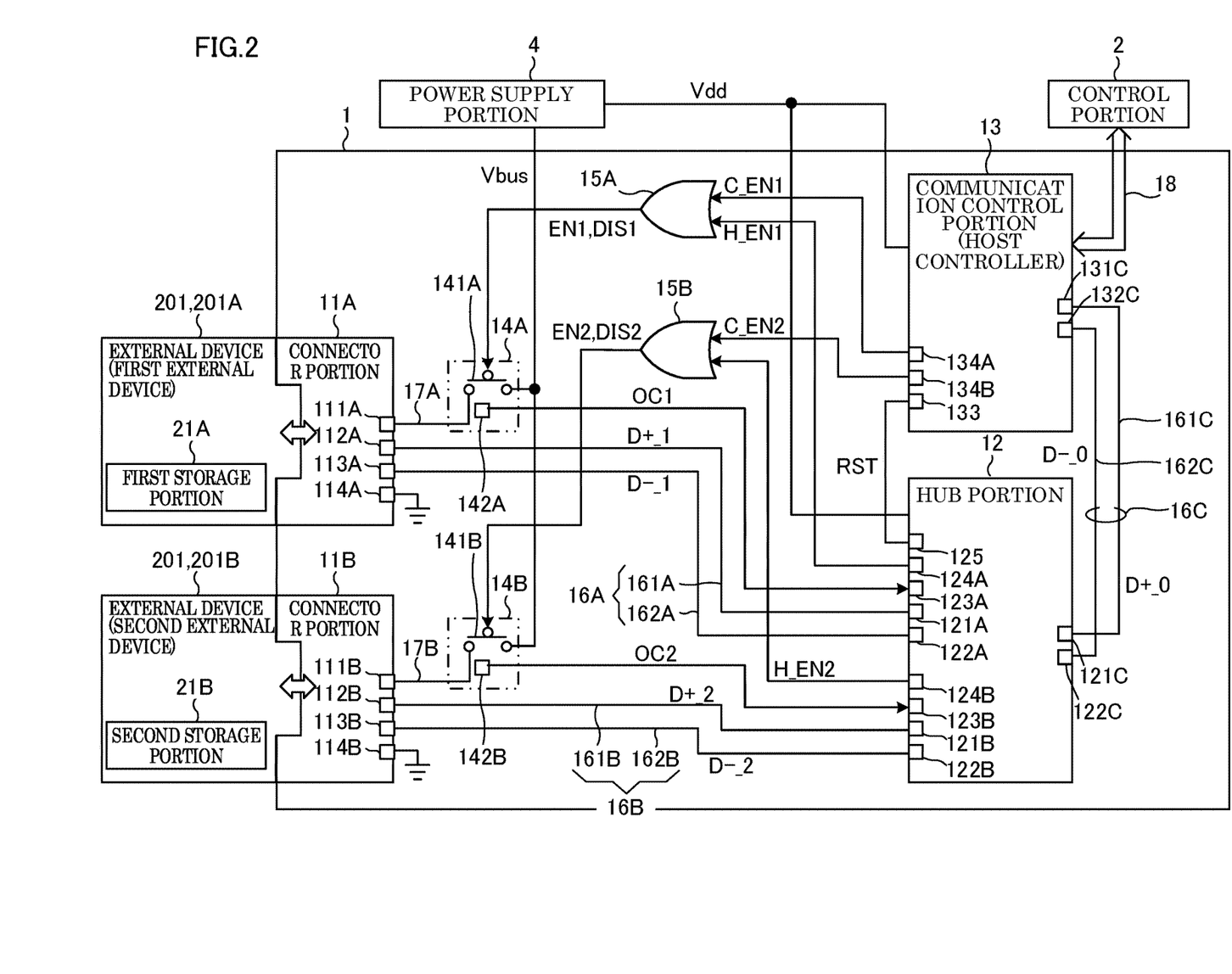
FIG. 2 is a block diagram showing a configuration of a communication portion shown in FIG. 1.

The communication portion 1 is an example of a communication device of the present invention. The communication portion 1 includes a plurality of electronic parts for data communications based on a USB (Universal Serial Bus) standard. As shown in FIG. 2, the plurality of electronic parts include two connector portions 11A and 11B, a hub portion 12, a communication control portion 13, two application portions 14A and 14B, and two first output portions 15A and 15B, and are mounted on a circuit board.

A plurality of wirings for electrically connecting the plurality of electronic parts are formed on the circuit board. The plurality of wirings include differential transmission paths 16A, 16B, and 16C and power supply lines 17A and 17B. The differential transmission path 16A includes data lines 161A and 162A, the differential transmission path 16B includes data lines 161B and 162B, and the differential transmission path 16C includes data lines 161C and 162C.

The connector portions 11A and 11B are USB connectors or the like. The external devices 201 are respectively inserted in, and connected to, the connector portions 11A and 11B in a removable manner.

The two external devices 201 are an example of a plurality of external devices of the present invention. The external devices 201 function as nodes in the data communications. The two external devices 201 include a first external device 201A and a second external device 201B. In FIG. 2, the first external device 201A is inserted in the connector portion 11A, and the second external device 201B is inserted in the connector portion 11B. Each of the first external device 201A and the second external device 201B receives, through the communication portion 1, an application of a constant voltage Vbus (for example, +5V) that is generated by the power supply portion 4 by a bus power system based on the USB standard.

The first external device 201A is a wireless LAN (Local Area Network) adaptor or the like. The first external device 201A performs a wireless bidirectional data communication (hereinafter referred to as a wireless communication) with an information processing apparatus (a personal computer or the like) not shown in the drawings. Specifically, the first external device 201A receives first image data from the information processing apparatus via the wireless communication. The first external device 201A further generates a differential signal based on the USB standard from the first image data, and outputs the differential signal to the connector portion 11A. The differential signal includes a positive phase signal D+_1 and a negative phase signal D−_1 whose polarities are inverted to each other. It is noted that in the following description, the positive phase signal D+_1 is simply referred to as a signal D+_1 and the negative phase signal D−_1 is simply referred to as a signal D−_1.

The first external device 201A includes a first storage portion 21A. The first storage portion 21A is a volatile memory and configured to store information when the constant voltage Vbus is being applied. In other words, when the application of the constant voltage Vbus is interrupted, the information stored so far is lost from the first storage portion 21A. Specifically, the information includes, for example, identification information for identifying the communication control portion 13 in the data communication.

The second external device 201B is a USB memory or the like, and includes a second storage portion 21B. The second storage portion 21B is a nonvolatile memory and configured to store information even when the constant voltage Vbus is not applied. The second storage portion 21B stores second image data. The second external device 201B generates a differential signal based on the USB standard from the second image data read from the second storage portion 21B, and outputs the differential signal to the connector portion 11B. The differential signal includes a positive phase signal D+_2 and a negative phase signal D−_2 whose polarities are inverted to each other. It is noted that in the following description, the positive phase signal D+_2 is simply referred to as a signal D+_2 and the negative phase signal D− 2 is simply referred to as a signal D−_2.

The connector portion 11A includes a power supply terminal 111A, a positive phase terminal 112A, a negative phase terminal 113A, and a ground terminal 114A. The power supply terminal 111A is electrically connected to the power supply portion 4 by the power supply line 17A. The power supply line 17A is provided with an application portion 14A configured to apply the constant voltage Vbus generated by the power supply portion 4 to the first external device 201A through the power supply terminal 111A. The positive phase terminal 112A is electrically connected to a positive phase terminal 121A of the hub portion 12 by the data line 161A. The signal D+_1 is transmitted to the positive phase terminal 121A through the positive phase terminal 112A and the data line 161A. The negative phase terminal 113A is electrically connected to a negative phase terminal 122A of the hub portion 12 by the data line 162A. The signal D−_1 is transmitted to the negative phase terminal 122A through the negative phase terminal 113A and the data line 162A. The ground terminal 114A is grounded.

The connector portion 11B includes a power supply terminal 111B, a positive phase terminal 112B, a negative phase terminal 113B, and a ground terminal 114B. The power supply terminal 111B is electrically connected to the power supply portion 4 by the power supply line 17B. The power supply line 17B is provided with an application portion 14B configured to apply the constant voltage Vbus generated by the power supply portion 4 to the second external device 201B through the power supply terminal 111B. The positive phase terminal 112B is electrically connected to a positive phase terminal 121B of the hub portion 12 by the data line 161B. The signal D+_2 is transmitted to the positive phase terminal 121B through the positive phase terminal 112B and the data line 161B. The negative phase terminal 113B is electrically connected to a negative phase terminal 122B of the hub portion 12 by the data line 162B. The signal D−_2 is transmitted to the negative phase terminal 122B through the negative phase terminal 113B and the data line 162B. The ground terminal 114B is grounded.

The hub portion 12 is connected to a plurality of external devices 201. The hub portion 12 is a line concentrator, and more specifically, for example, an integrated circuit of a USB hub. The hub portion 12 includes three positive phase terminals 121A, 121B, and 121C and three negative phase terminals 122A, 122B, and 122C. It is noted that the positive phase terminal 121A and the negative phase terminal 122A are a pair of differential terminals, the positive phase terminal 121B and the negative phase terminal 122B are a pair of differential terminals, and the positive phase terminal 121C and the negative phase terminal 122C are a pair of differential terminals.

The hub portion 12 outputs, as a positive phase signal D+_0 from the positive phase terminal 121C, the signal D+_1 input to the positive phase terminal 121A, and the signal D+_2 input to the positive phase terminal 121B. The positive phase terminal 121C is electrically connected to a positive phase terminal 131C of the communication control portion 13 by the data line 161C. The signal D+_0 is transmitted from the positive phase terminal 121C to the positive phase terminal 131C through the data line 161C. The hub portion 12 outputs, as a negative phase signal D−_0 from the negative phase terminal 122C, the signal D−_1 input to the negative phase terminal 122A, and the signal D−_2 input to the negative phase terminal 122B. The negative phase terminal 122C is electrically connected to a negative phase terminal 132C of the communication control portion 13 by the data line 162C. The signal D−_0 is transmitted from the negative phase terminal 122C to the negative phase terminal 132C through the data line 162C. It is noted that according to the USB standard, each of the external devices 201 outputs a differential signal in response to a polling from the communication control portion 13. As a result, in the hub portion 12, the signal D+_1 and the signal D+_2 do not collide with each other, and the signal D−_1 and the signal D−_2 do not collide with each other.

The hub portion 12 outputs an enable signal H_EN1 from a control terminal 124A provided in the hub portion 12, and outputs an enable signal H_EN2 from a control terminal 124B provided in the hub portion 12. The enable signal H_EN1 is a signal to control ON/OFF of the application portion 14A. The enable signal H_EN2 is a signal to control ON/OFF of the application portion 14B. The enable signals H_EN1 and H_EN2 correspond to a second enable signal of the present invention, and a status value of each of the enable signals H_EN1 and H_EN2 changes between a first value and a second value, wherein the second value is lower than the first value. The hub portion 12 sets the status values of the enable signals H_EN1 and H_EN2 based on the state of the communication portion 1. Setting the status value is described in detail below.

It is noted that, for example, in a case where a signal transmitted in the communication portion 1 is a voltage signal, the status value used in the present embodiment is a voltage level (voltage value) of the signal. In this case, the first value represents what is called a HIGH level that is a voltage value higher than a predetermined threshold, and the signal of the first value is also called a HIGH level signal or a HIGH signal. In addition, the second value represents what is called a LOW level that is a voltage value lower than a predetermined threshold, and the signal of the second value is also called a LOW level signal or a LOW signal.

The communication control portion 13 performs data communications with a plurality of external devices 201 through the hub portion 12. Specifically, the communication control portion 13 is an integrated circuit of a USB host controller or the like, and functions as what is called a host in the data communications.

The communication control portion 13 includes the positive phase terminal 131C and the negative phase terminal 132C, receives the signal D+_0 through the positive phase terminal 131C, and receives the signal D−_0 through the negative phase terminal 132C. The communication control portion 13 reproduces the first image data from the signal D+_0 and the signal D−_0. In addition, the communication control portion 13 reproduces the second image data from the signal D+_0 and the signal D−_0. The communication control portion 13 is connected to the control portion 2 by an internal bus 18 such that that the data communication can be performed, and transmits the first image data and the second image data to the control portion 2 through the internal bus 18.

The communication control portion 13 further outputs an enable signal C_EN1 from a control terminal 134A provided in the communication control portion 13, and outputs an enable signal C_EN2 from a control terminal 134B provided in the communication control portion 13. The enable signal C_EN1 is a signal to control a voltage application of the application portion 14A. The enable signal C_EN2 is a signal to control a voltage application of the application portion 14B. The enable signals C_EN1 and C_EN2 correspond to a first enable signal of the present invention, and a status value of each of the enable signals C_EN1 and C_EN2 changes between the first value and the second value. The communication control portion 13 sets the status values of the enable signals C_EN1 and C_EN2 based on the state of the communication portion 1. Setting the status value is described in detail below.

The two application portions 14A and 14B are an example of a plurality of application portions of the present invention. Specifically, the application portions 14A and 14B are switch ICs that can be used for the power supply lines 17A and 17B based on the USB standard, and include switch portions 141A and 141B.

The application portion 14A is provided in correspondence with the first external device 201A. The switch portion 141A of the application portion 14A turns ON when it receives an effective signal EN1 from the first output portion 15A. In this case, the application portion 14A applies the constant voltage Vbus to the first external device 201A through the power supply line 17A. The switch portion 141A of the application portion 14A turns OFF when it receives a stop signal DIS1 from the first output portion 15A. In this case, the application portion 14A stops applying the constant voltage Vbus to the first external device 201A.

The application portion 14B is provided in correspondence with the second external device 201B. The switch portion 141B of the application portion 14B turns ON when it receives an effective signal EN2 from the first output portion 15B. In this case, the application portion 14B applies the constant voltage Vbus to the second external device 201B through the power supply line 17B. The switch portion 141B of the application portion 14B turns OFF when it receives a stop signal DIS2 from the first output portion 15B. In this case, the application portion 14B stops applying the constant voltage Vbus to the second external device 201B.

In a case where the application portion 14A is the switch IC, the application portion 14A further includes a second output portion 142A. The second output portion 142A of the application portion 14A includes a sensor configured to detect an overcurrent flowing through the power supply line 17A. When the sensor detects an overcurrent, the second output portion 142A outputs a detection signal OC1 (an overcurrent signal) indicating the fact, to a control terminal 123A provided in the hub portion 12. In a case where the application portion 14B is the switch IC, the application portion 14B further includes a second output portion 142B. The second output portion 142B of the application portion 14B includes a sensor configured to detect an overcurrent flowing through the power supply line 17B. When the sensor detects an overcurrent, the second output portion 142B outputs a detection signal OC2 (an overcurrent signal) indicating the fact, to a control terminal 123B provided in the hub portion 12.

The first output portion 15A is provided in correspondence with the application portion 14A, and is an OR circuit to which the enable signal C_EN1 from the communication control portion 13 and the enable signal H_EN1 from the hub portion 12 can be input. The first output portion 15A outputs the effective signal EN1 or the stop signal DIS1 according to the status values of the enable signals C_EN1 and H_EN1, to the application portion 14A corresponding to the first output portion 15A. The first output portion 15A outputs the effective signal EN1 of the first value when the status value of at least one of the enable signals H_EN1 and C_EN1 is the first value (HIGH level). In addition, the first output portion 15A outputs the stop signal DIS1 of the second value when the status values of both the enable signals H_EN1 and C_EN1 are the second value (LOW level).

In addition, the first output portion 15B is provided in correspondence with the application portion 14B, and is an OR circuit to which the enable signal C_EN2 from the communication control portion 13 and the enable signal H_EN2 from the hub portion 12 can be input. The first output portion 15B outputs the effective signal EN2 or the stop signal DIS2 according to the status values of the enable signals C_EN2 and H_EN2 to the application portion 14B corresponding to the first output portion 15B. The first output portion 15B outputs the effective signal EN2 of the first value when the status value of at least one of the enable signals H_EN2 and C_EN2 is the first value (HIGH level). In addition, the first output portion 15B outputs the stop signal DIS2 of the second value when the status values of both the enable signals H_EN2 and C_EN2 are the second value (LOW level).

In FIG. 1, the control portion 2 includes: a processor that is a CPU or the like; a program storage portion that is a ROM or the like; and a main storage portion that is a RAM or the like. The processor executes, by using the main storage portion, a program that is preliminarily stored in the program storage portion. This allows the control portion 2 to control the components of the image forming apparatus 100 comprehensively. In addition, the control portion 2 performs processing such as rasterizing on the first image data or the second image data transmitted from the communication control portion 13, and transmits the image data after the processing to the image forming portion 3. It is noted that the control portion 2 may be an electronic circuit such as an ASIC (Application Specific Integrated Circuit) or a DSP (Digital Signal Processor).

The image forming portion 3 forms an image on a sheet such as a sheet of paper based on the first image data or the second image data transmitted from the control portion 2, by an electrophotographic method or an inkjet method. The sheet with the image formed thereon is discharged to outside the image forming apparatus 100.

The power supply portion 4 receives an applied voltage from a commercial power supply (not shown) via an AC adapter, and generates an operation voltage Vdd and the constant voltage Vbus, wherein the operation voltage Vdd is for operation of the hub portion 12, the communication control portion 13, the control portion 2 and the like.

Figure 3:
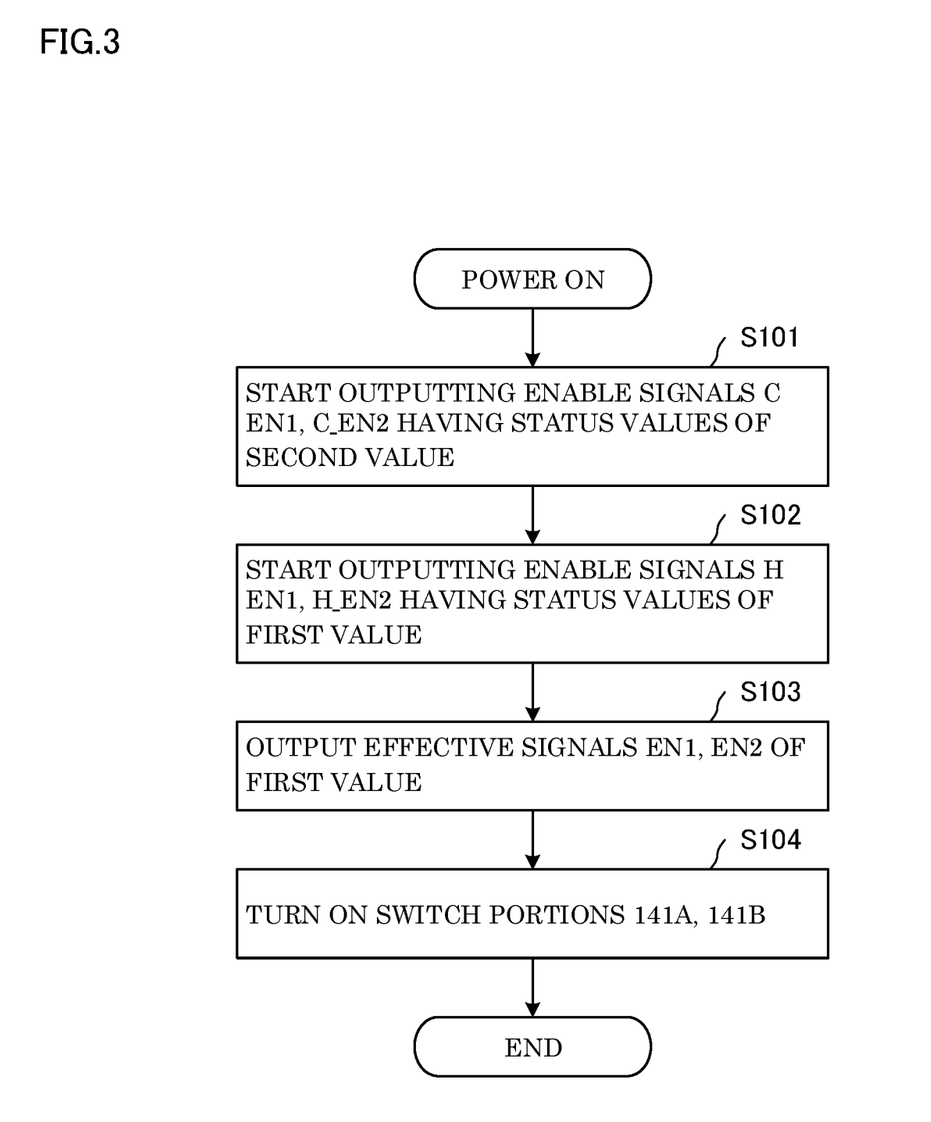

The following describes in detail, with reference to FIG. 3, an operation of the communication portion 1 performed when the main power supply of the image forming apparatus 100 is turned on.

When the main power supply is turned on, the power supply portion 4 starts generating the operation voltage Vdd. Upon activated by an application of the operation voltage Vdd, the communication control portion 13 starts outputting the enable signal C_EN1 of the second value to the first output portion 15A, and outputting the enable signal C_EN2 of the second value to the first output portion 15B (step S101 in FIG. 3). In step S101, the status values of the enable signal C_EN1 and the enable signal C_EN2 are set to the second value by the communication control portion 13.

Upon activated by an application of the operation voltage Vdd, the hub portion 12 starts outputting the enable signal H_EN1 of the first value to the first output portion 15A, and outputting the enable signal H_EN2 of the first value to the first output portion 15B (step S102 in FIG. 3). In step S102, the status values of the enable signal H_EN1 and the enable signal H_EN2 are set to the first value by the hub portion 12.

In the first output portion 15A, the OR circuit starts outputting the effective signal EN1 of an inclusive OR (namely, the first value) of the enable signal C_EN1 of the second value and the enable signal H_EN1 of the first value. In addition, in the first output portion 15B, the OR circuit starts outputting the effective signal EN2 of an inclusive OR (namely, the first value) of the enable signal C_EN2 of the second value and the enable signal H_EN2 of the first value (step S103). As a result, the switch portion 141A of the application portion 14A and the switch portion 141B of the application portion 14B turn ON (step S104).

Figure 4:
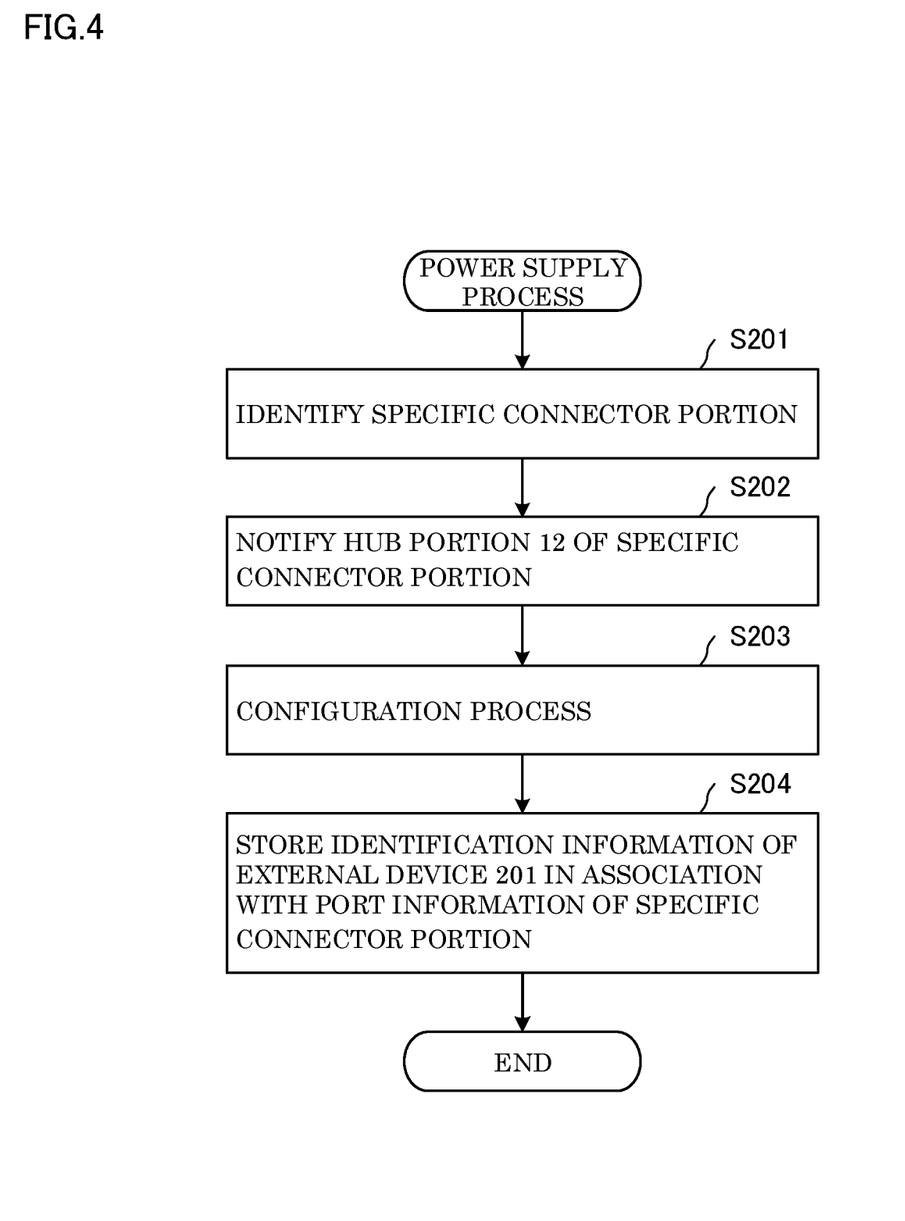
FIG. 4 is a flowchart showing an operation of the communication portion performed upon insertion of an external device shown in FIG. 2, in a connector portion.

Next, the following describes in detail, with reference to FIG. 4, an operation of the communication portion 1 performed upon insertion of the external device 201 in either the connector portion 11A or the connector portion 11B.

The communication control portion 13 identifies, by a method defined in the USB standard, a connector portion (hereinafter referred to as a specific connector), namely, either of the two connector portions 11A and 11B, in which the external device 201 has been inserted (step S201). The communication control portion 13 notifies the hub portion 12 of the specific connector portion (step S202).

Subsequently, the communication control portion 13 executes a configuration process defined in the USB standard (step S203). With the configuration process, the communication control portion 13 acquires the identification information and the like of the external device 201 inserted in the specific connector portion (namely, the connector portion 11A or the connector portion 11B), from the external device 201 through the hub portion 12. It is noted that during the configuration process, the external device 201 inserted in the connector portion 11A or the connector portion 11B acquires identification information and the like of the communication control portion 13 through the hub portion 12 and stores the acquired information.

Figure 7:
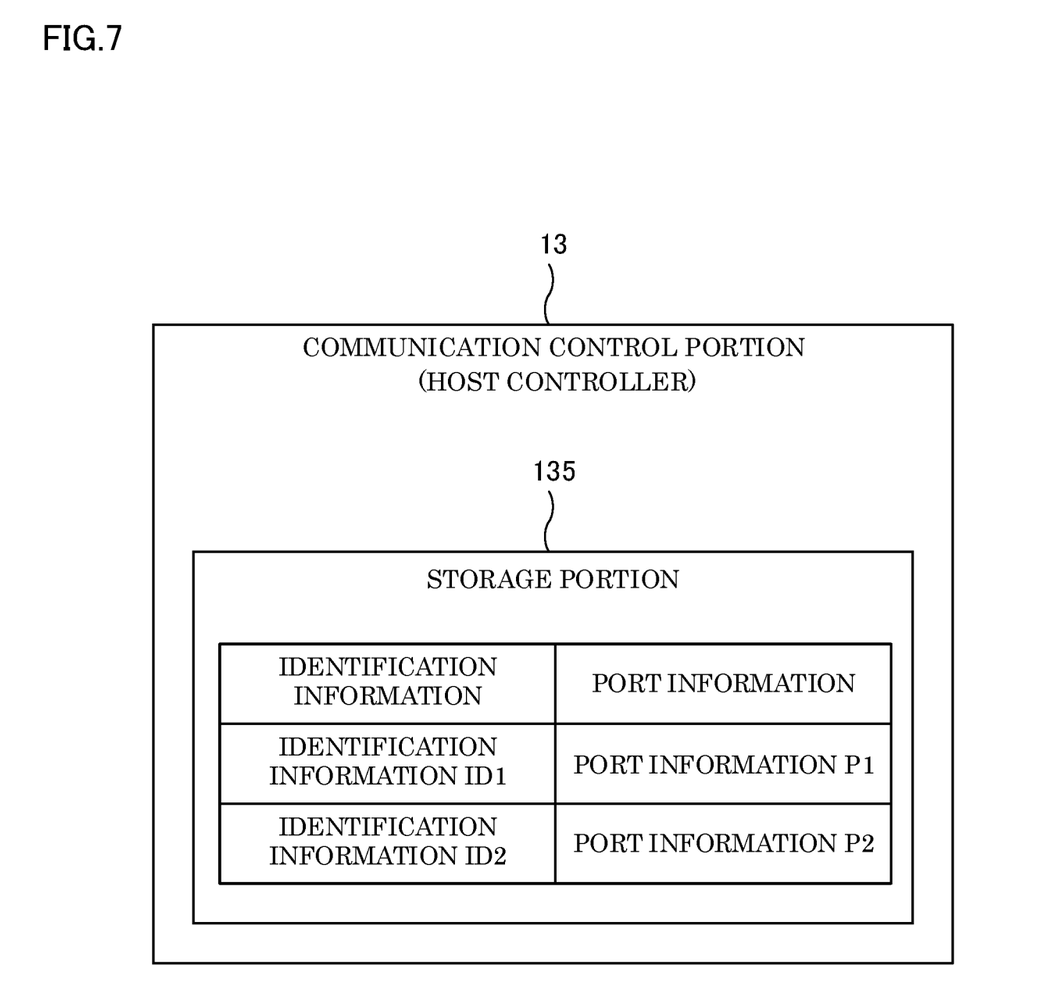
FIG. 7 is a schematic diagram showing information stored in a storage portion included in a communication control portion shown in FIG. 2.

As shown in FIG. 7, the communication control portion 13 includes a storage portion 135, and stores, in the storage portion 135, the identification information and the like of the external device 201 inserted in the specific connector portion, in association with port information identifying the specific connector portion (step S204). Specifically, in step S204, in a case where the specific connector portion is the connector portion 11A, and when the first external device 201A is inserted in the connector portion 11A, identification information ID1 of the first external device 201A and port information P1 are stored in association with each other in the storage portion 135. In addition, in step S204, in a case where the specific connector portion is the connector portion 11B, and when the second external device 201B is inserted in the connector portion 11B, identification information ID2 of the second external device 201B and port information P2 are stored in association with each other in the storage portion 135.

After step S204 is completed, the communication control portion 13 can perform a data communication with the first external device 201A or the second external device 201B.

Figure 5:
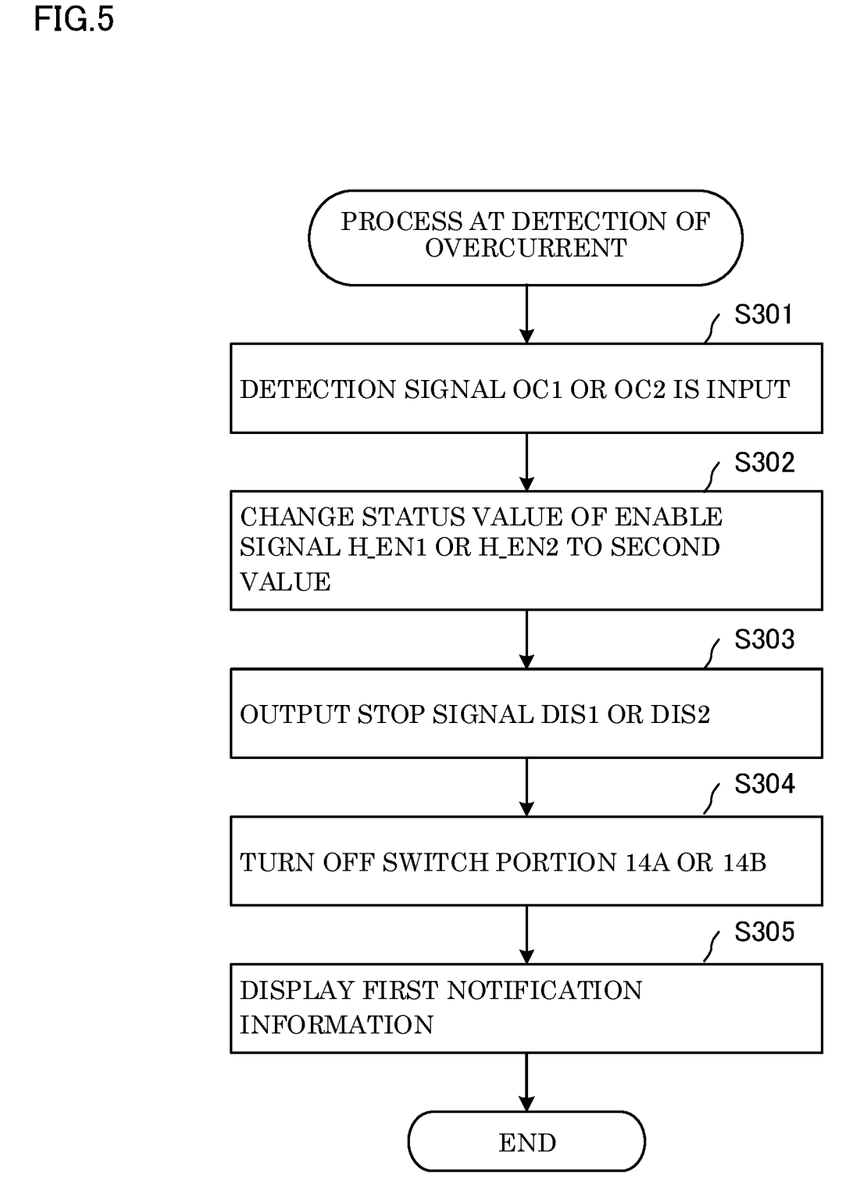
FIG. 5 is a flowchart showing an operation of the communication portion performed upon detection of an over-current by an application portion shown in FIG. 2.

Next, the following describes in detail, with reference to FIG. 5, an operation of the communication portion 1 performed when the second output portion 142A of the application portion 14A or the second output portion 142B of the application portion 14B has detected an overcurrent.

When an overcurrent flowing through the power supply line 17A is detected, a detection signal OC1 is input to the hub portion 12; and when an overcurrent flowing through the power supply line 17B is detected, a detection signal OC2 is input to the hub portion 12 (step S301).

Subsequently, in a case where the detection signal OC1 is input in step S301, in step S302, the hub portion 12 changes, from the first value to the second value, the status value of the enable signal H_EN1 that is output from the control terminal 124A in response to the detection signal OC1. In addition, in a case where the detection signal OC2 is input in step S301, in step S302, the hub portion 12 changes, from the first value to the second value, the status value of the enable signal H_EN2 that is output from the control terminal 124B in response to the detection signal OC2. When an overcurrent is detected, the application portions 14A and 14B need to be turned OFF quickly. As a result, the hub portion 12 changes the status values of the enable signal H_EN1 and the enable signal H_EN2 from the first value to the second value not by software processing, but by hardware processing (specifically, a logic circuit). It is noted that the communication control portion 13 maintains to output the enable signals C_EN1 and C_EN2 having the status values of the second value. That is, even if an overcurrent flows through the power supply line 17A or the power supply line 17B, the communication control portion 13 maintains, to the second value, the status value of the enable signal C_EN1 output to the first output portion 15A or the enable signal C_EN2 output to the first output portion 15B, before and after the flow of the overcurrent.

In step S303, in a case where the enable signal H_EN1 having the status value of the second value is output in step S302, the first output portion 15A starts outputting the stop signal DIS1. In other words, upon detection of the overcurrent by the application portion 14A, the signal output from the first output portion 15A is changed from the effective signal EN1 to the stop signal DIS1.

In addition, in step S303, in a case where the enable signal H_EN2 having the status value of the second value is output in step S302, the first output portion 15B starts outputting the stop signal DIS2. In other words, upon detection of the overcurrent by the application portion 14B, the signal output from the first output portion 15B is changed from the effective signal EN2 to the stop signal DIS2.

The switch portion 141A of the application portion 14A turns OFF when the stop signal DIS1 is output in step S303, and the switch portion 141B of the application portion 14B turns OFF when the stop signal DIS2 is output in step S303 (step S304). This causes the application portion 14A to stop applying the constant voltage Vbus to the first external device 201A. Alternatively, this causes the application portion 14B to stop applying the constant voltage Vbus to the second external device 201B.

Subsequently, the communication control portion 13 displays first notification information on a display portion (not shown) provided in the image forming apparatus 100 (step S305). The first notification information is information to urge the user of the image forming apparatus 100 to re-insert the first external device 201A when an overcurrent has flown through the application portion 14A, and to urge the user to re-insert the second external device 201B when an overcurrent has flown through the application portion 14B. Upon re-insertion of the first external device 201A or the second external device 201B by the user, the communication portion 1 executes the process of FIG. 4 again. This allows the first external device 201A or the second external device 201B to be identified again.

Figure 6:
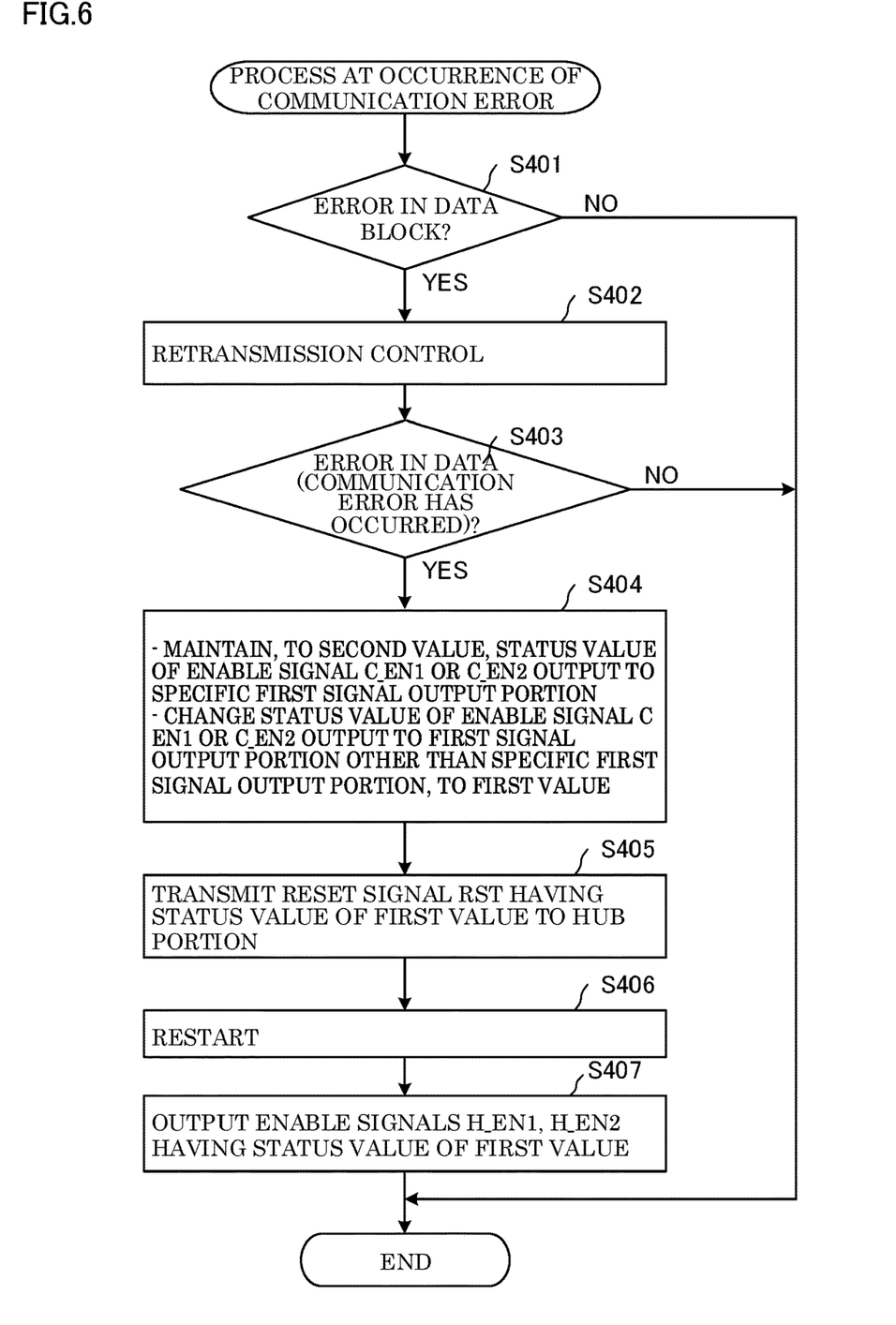
FIG. 6 is a flowchart showing an operation of the communication portion performed upon occurrence of a communication error in a data communication with an external device shown in FIG. 2.

Next, the following describes in detail, with reference to FIG. 6, an operation of the communication portion 1 performed upon occurrence of a communication error in a data communication with the first external device 201A or the second external device 201B.

Each of the first external device 201A and the second external device 201B, in response to a polling from the communication control portion 13, differentially transmits a plurality of data packets as defined in the USB standard to the communication control portion 13. The plurality of data packets include data blocks and an error correction code. The data blocks are generated by dividing the first image data or the second image data into blocks of a predetermined data size. The error correction code is added by the information processing apparatus so that the communication control portion 13 can execute the CRC (Cyclic Redandancy Check). The communication control portion 13 determines whether or not there is an error in any of the plurality of data blocks by executing the CRC while reproducing the first image data from the plurality of data packets received from the first external device 201A through the hub portion 12 (step S401 of FIG. 6). In addition, the communication control portion 13 determines whether or not there is an error in any of the plurality of data blocks by executing the CRC while reproducing the second image data from the plurality of data packets received from the second external device 201B through the hub portion 12. It is noted that hereinafter, a data packet that includes a data block in which an error has been detected, is referred to as a target data packet.

Upon determining in step S401 that there is no error in any of the data blocks, the communication control portion 13 ends the process of FIG. 6 and continues the data communication with the first external device 201A or the second external device 201B. Upon determining in step S401 that there is an error in any of the data blocks, the communication control portion 13 moves the process to step S402.

In step S402, the communication control portion 13 executes a retransmission control. Specifically, in a case where the first image data is being reproduced, the communication control portion 13, during the retransmission control, requests the information processing apparatus, through the first external device 201A, to retransmit the target data packet. During the retransmission control, the communication control portion 13 receives the target data packet retransmitted from the information processing apparatus through the first external device 201A. The communication control portion 13 executes the CRC on the target data packet received from the first external device 201A. In addition, in a case where the second image data is being reproduced, the communication control portion 13, during the retransmission control, requests the second external device 201B to retransmit the target data packet, and receives the target data packet retransmitted from the second external device 201B. The communication control portion 13 executes the CRC on the target data packet received from the second external device 201B.

Next, after executing the CRC, the communication control portion 13 determines in step S403 whether or not there is an error in the target data packet. Upon determining that there is no error in the target data packet, the communication control portion 13 ends the process of FIG. 6 and continues the data communication with the first external device 201A or the second external device 201B. Upon determining in step S403 that there is an error in the target data packet, the communication control portion 13 determines that a communication error has occurred in the data communication with the first external device 201A or the second external device 201B, and moves the process to step S404. It is noted that hereinafter, a first output portion, namely the first output portion 15A or the first output portion 15B, that corresponds to an external device 201 in which the communication error has occurred, is referred to as a specific first output portion.

In step S401, before and after the occurrence of the communication error, the communication control portion 13 maintains, to the second value (LOW level), the status value of the enable signal C_EN1 or the enable signal C_EN2 output to the specific first output portion. On the other hand, upon occurrence of the communication error, the communication control portion 13 changes the status value of the enable signal C_EN1 or the enable signal C_EN2 output to the first output portion other than the specific first output portion, from the second value to the first value (HIGH level) (step S404).

Specifically, identification information of the external device 201 has been attached to each of the data packets. In addition, the storage portion 135 (see FIG. 7) stores the identification information and the port information in association with each other. In step S404, the communication control portion 13 acquires, from the storage portion 135, as error port information, a piece of port information corresponding to the identification information included in the data packet in which the communication error has occurred.

For example, in a case where a communication error has occurred in the data communication with the second external device 201B, the error port information is the port information P2 of the connector portion 11B. In this case, the communication control portion 13 maintains, to the second value, the status value of the enable signal C_EN2 that is output to the first output portion 15B (namely, the specific first output portion) corresponding to the connector portion 11B. On the other hand, the communication control portion 13 changes, from the second value to the first value, the status value of the enable signal C_EN1 that is output to the first output portion 15A (namely, the first output portion other than the specific first output portion) corresponding to the connector portion 11A connected to the second external device 201B in which the communication error has not occurred.

Subsequently, the communication control portion 13 outputs and transmits a reset signal RST from a control terminal 133 provided in the communication control portion 13, to the hub portion 12 (step S405). The reset signal RST is used to restart the hub portion 12, and the status value thereof is the first value or the second value.

Upon receiving, through a control terminal 125 provided in the hub portion 12, the reset signal RST having the status value of, for example, the first value, the hub portion 12 performs a restart (step S406). That is, the hub portion 12 has a built-in switching element (not shown) that operates in accordance with the status value of the reset signal RST, and upon receiving the reset signal RST having the status value of the first value, the hub portion 12 causes the switching element to operate to cut off the inner power supply line, thereby suspending reception of the operation voltage Vdd applied by the power supply portion 4. Subsequently, when the communication control portion 13 stops outputting the reset signal RST having the status value of the first value, the hub portion 12 restores the switching portion to the original state to conduct the power supply line, and receives the operation voltage Vdd again.

When reception of the operation voltage Vdd applied by the power supply portion 4 stops, the hub portion 12 outputs the enable signals H_EN1 and H_EN2 having the status value of the second value (LOW level). Here, in a case where a communication error has occurred in a communication with the second external device 201B, the enable signal C_EN2 having the status value of the second value has been input to the first output portion 15B since the first output portion 15B is the specific first output portion. As a result, the first output portion 15B outputs the stop signal DIS2. On the other hand, in a case where a communication error has not occurred in a communication with the second external device 201A, the enable signal C_EN1 having the status value of the first value (HIGH level) has been input to the first output portion 15A since the first output portion 15A is the first output portion other than the specific first output portion. As a result, the first output portion 15A outputs the effective signal EN1.

After the restart, as defined in the USB standard, the hub portion 12 starts outputting the enable signal H_EN1 of the first value to the first output portion 15A, and starts outputting the enable signal H_EN2 of the first value to the first output portion 15B (step S407 of FIG. 6). In step S407, the status values of the enable signal H_EN1 and the enable signal H_EN2 are set to the first value by the hub portion 12. In other words, when the communication control portion 13 determines that a communication error has occurred, the hub portion 12 restarts the hub portion 12. After the restart, the hub portion 12 further changes the status values of the enable signal H_EN1 and the enable signal H_EN2 respectively output to the first output portions 15A and 15B, from the second value to the first value.

Even after step S404, the enable signal (namely, the enable signal C_EN1 or the enable signal C_EN2) having the status value of the second value continues to be input to the specific first output portion, and after step S407, the enable signal (namely, the enable signal H EN1 or the enable signal H_EN2) having the status value of the first value is input. As a result, after step S407, the specific first output portion outputs the effective signal to an application portion corresponding to the specific first output portion. Furthermore, after step S404, the first enable signal (namely, the enable signal C_EN1 or the enable signal C_EN2) having the status value of the first value is input to, among the two first output portions 15A and 15B, the first output portion other than the specific first output portion, and after step S407, the second enable signal (namely, the enable signal H_EN1 or the enable signal H_EN2) having the status value of the first value is input to the first output portion other than the specific first output portion. As a result, the first output portion other than the specific first output portion continues to output the effective signal to the application portion corresponding to the first output portion while the hub portion 12 is performing the restart.

If a communication error occurs to any of the external devices 201 connected to the plurality of connector portions 11A and 11B, the communication control portion 13 outputs, to the hub portion 12, the reset signal RST having the status value of the first value to restart the hub portion 12. The restart causes the control of the voltage application by the hub portion 12 to return to the initial state. Here, if step S404 of FIG. 6 is not executed, all of the plurality of application portions 14A and 14B temporarily turn OFF, and the application of the constant voltage Vbus to all the external devices 201 is stopped. In particular, the first external device 201A stores the identification information necessary for the data communication, in the first storage portion 21A that is volatile. As a result, if step S404 of FIG. 6 is not executed, the application of the constant voltage Vbus to the first external device 201A is stopped and the identification information is lost if a communication error occurs to a data communication with the second external device 201B even if a communication error does not occur to a data communication with the first external device 201A.

On the other hand, by executing step S404 of FIG. 6, the communication control portion 13 maintains the ON state of the application portion corresponding to the first output portion other than the specific first output portion before and after the occurrence of the communication error. As a result, if a communication error occurs in a data communication with the second external device 201B while a communication error does not occur in a data communication with the first external device 201A, the communication control portion 13 maintains, to the second value, the status value of the enable signal C_EN2 output to the specific first output portion corresponding to the second external device 201B in which the communication error has occurred, before and after the occurrence of the communication error. On the other hand, upon occurrence of the communication error, the communication control portion 13 changes, from the second value to the first value, the status value of the enable signal C_EN1 output to the specific first output portion corresponding to the second external device in which the communication error has not occurred. This prevents interruption of the application of the constant voltage Vbus to the first external device 201A, thereby preventing the identification information from being lost from the first storage portion 21A. At this time, the application of the constant voltage Vbus to the first external device 201A is not interrupted even if a restart of the hub portion 12 is performed. It is thus possible to prevent the identification information from being lost from the first storage portion 21A. As described above, according to the present embodiment, in a case where a voltage can be applied to the plurality of external devices 201 through the plurality of application portions 14A and 14B, if a communication error occurs in a communication with a part of the external devices 201 (specifically, the second external device 201B), it is possible to prevent stoppage of an application of the constant voltage Vbus to the other external device 201 (specifically, the first external device 201A).

It is noted that each of the first output portions 15A and 15B is not limited to the OR circuit, but may be a negative OR circuit (NOR circuit). However, in this case, the effective signals EN1 and EN2 output from the first output portions 15A and 15B have the second value, and the stop signals DIS1 and DIS2 have the first value.

The invention claimed is:

1. A communication device comprising:
a hub portion connected to a plurality of external devices;
a communication control portion configured to perform a data communication with the plurality of external devices through the hub portion;
a plurality of application portions provided in correspondence with the plurality of external devices and configured to, upon receiving an effective signal, apply a voltage to each of the plurality of external devices through a power supply line; and
a plurality of first output portions provided in correspondence with the plurality of application portions, wherein each of the plurality of first output portions is configured to receive a first enable signal from the communication control portion, receive a second enable signal from the hub portion, and output the effective signal or a stop signal according to status values of the first enable signal and the second enable signal, to a corresponding one of the application portions, wherein
in a case where a communication error has occurred in a data communication with one of the plurality of external devices, the communication control portion maintains, to a first value, a status value of the first enable signal output to one of the plurality of first output portions that corresponds to the one of the plurality of external devices in which the communication error has occurred, before and after an occurrence of the communication error, and upon the occurrence of the communication error, changes, from the first value to a second value that is different from the first value, a status value of the first enable signal output to another one of the plurality of first output portions that corresponds to another one of the plurality of external devices in which the communication error has not occurred,
in the case where the communication error has occurred, the hub portion restarts the hub portion and after a restart of the hub portion, changes, from the second value to the first value, a status value of the second enable signal output to all of the plurality of first output portions, and
each of the plurality of first output portions outputs the effective signal to each of the plurality of application portions respectively corresponding to the plurality of first output portions when status values of both the first enable signal and the second enable signal are each the second value.

2. The communication device according to claim 1, wherein
after changing, from the first value to the second value, the status value of the first enable signal output to another one of the plurality of first output portions that corresponds to another one of the plurality of external devices in which the communication error has not occurred, the communication control portion outputs a reset signal to the hub portion to restart the hub portion.

3. The communication device according to claim 1, wherein
the plurality of external devices include:
a first external device including a volatile memory; and
a second external device including a nonvolatile memory, and
in a case where a communication error has occurred in a data communication with the second external device, the communication control portion maintains, to the first value, the status value of the first enable signal output to one of the plurality of first output portions that corresponds to the second external device in which the communication error has occurred, before and after an occurrence of the communication error, and upon the occurrence of the communication error, changes, from the first value to the second value, the status value of the first enable signal output to another one of the plurality of first output portions that corresponds to the second external device in which the communication error has not occurred.

4. The communication device according to claim 1, further comprising:
- a plurality of second output portions configured to, in a case where an overcurrent has flown through a plurality of power supply lines, output an overcurrent signal indicating that the overcurrent has flown, to the hub portion, wherein
- after a flow of the overcurrent, the hub portion changes, from the second value to the first value, a status value of the second enable signal that is output in response to the overcurrent signal to one of the plurality of first output portions that corresponds to the power supply lines through which the overcurrent has flown,
- the communication control portion maintains, to the first value, the status value of the first enable signal output to one of the plurality of first output portions that corresponds to the power supply lines through which the overcurrent has flown, before and after the flow of the overcurrent,
- each of the plurality of first output portions is configured to, in a case where the status value of the first enable signal is the first value and the status value of the second enable signal is the first value, output the stop signal to each of the plurality of application portions respectively corresponding to the plurality of first output portions, and
- upon receiving the stop signal, each of the plurality of application portions stops applying the voltage to the plurality of external devices that respectively correspond to the plurality of application portions.

5. An image forming apparatus comprising:
the communication device according to claim 1.

* * * * *